July 7, 1925.
S. JOHNSON
IMPLEMENT CONNECTION
Filed Aug. 1, 1922
1,544,991
3 Sheets-Sheet 1
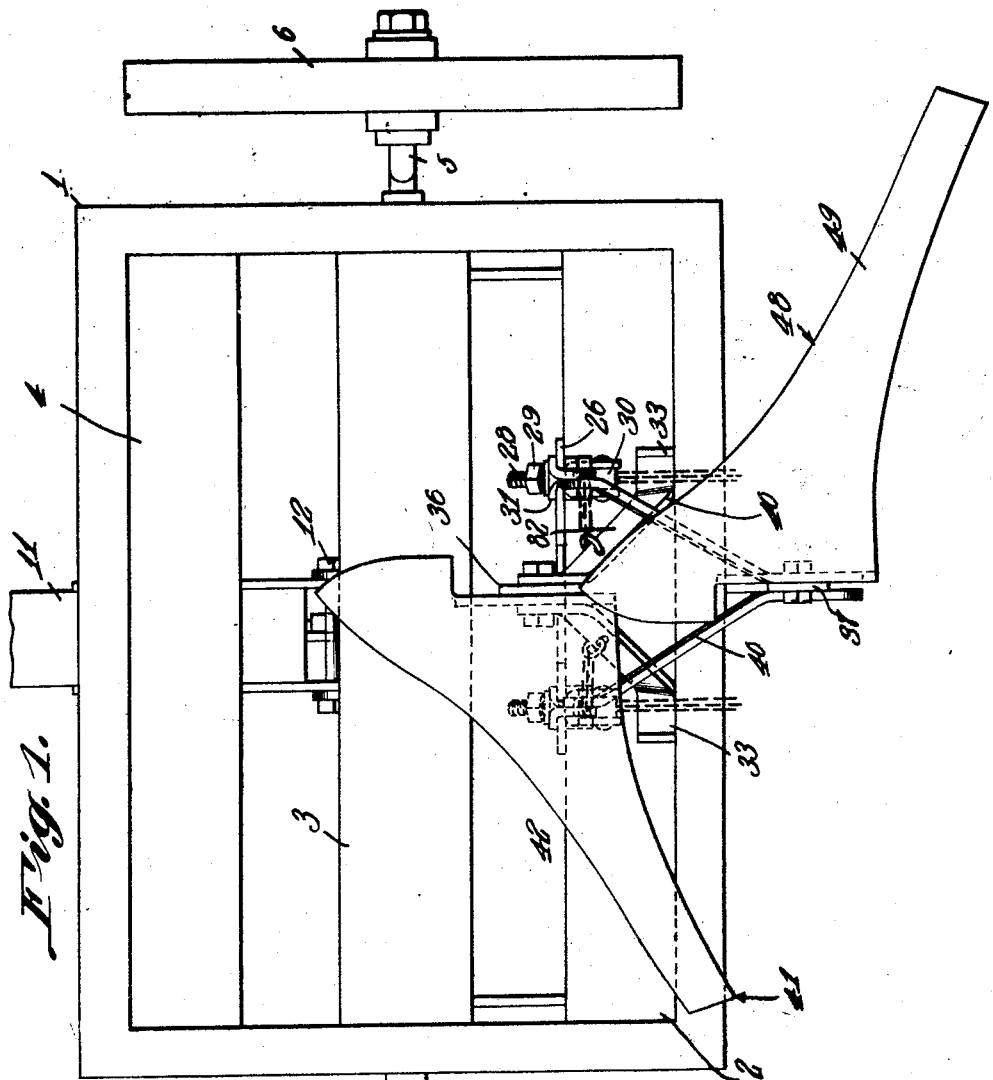
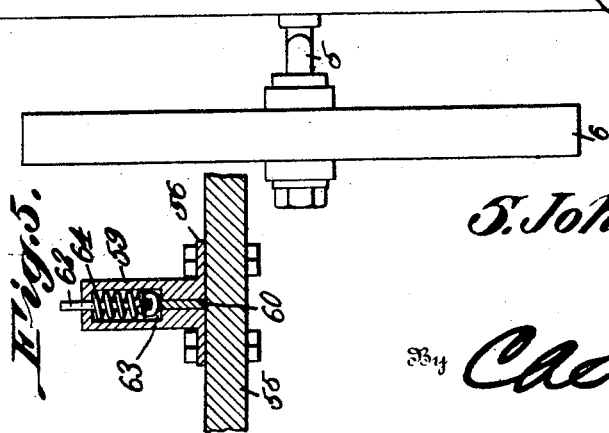
S. Johnson, Inventor
By C.A.Snow&Co.
Attorney

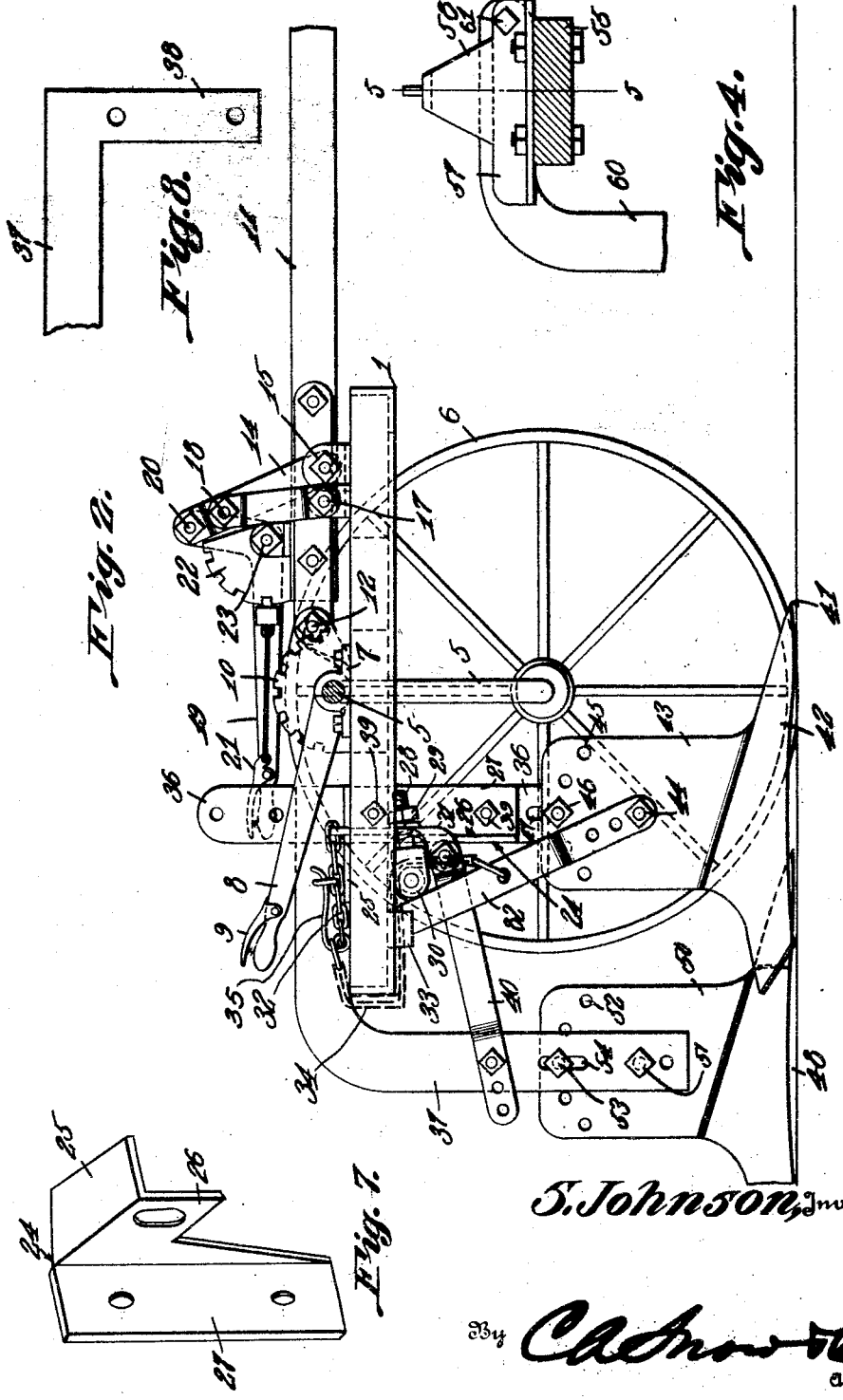

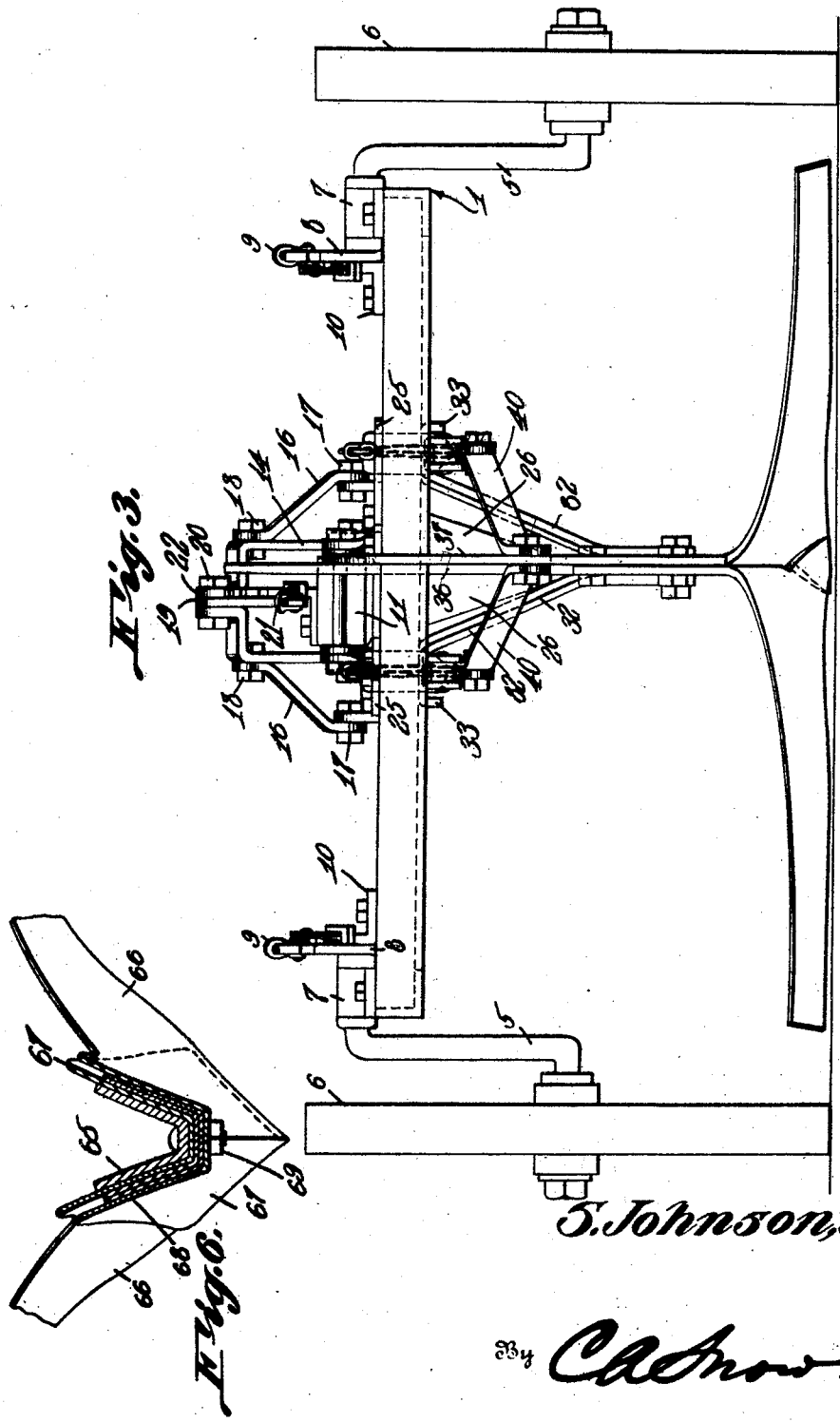

Patented July 7, 1925.

UNITED STATES PATENT OFFICE.

SAMUEL JOHNSON, OF TOOELE CITY, UTAH.

IMPLEMENT CONNECTION.

Application filed August 1, 1922. Serial No. 579,009.

*To all whom it may concern:*

Be it known that I, SAMUEL JOHNSON, a citizen of the United States, residing at Tooele city, in the county of Tooele and State of Utah, have invented a new and useful Implement Connection, of which the following is a specification.

The device forming the subject matter of this application is a weed cutter, and the invention aims to provide novel means for mounting the cutters on a vehicle and for adjusting the cutters thereon.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the drawings:—

Figure 1 shows in bottom plan, a device constructed in accordance with the invention; Figure 2 is a side elevation; Figure 3 is a rear elevation; Figure 4 is an elevation showing a modification; Figure 5 is a section on the line 5—5 of Figure 4; Figure 6 is a horizontal section showing another modification; Figure 7 is a perspective view delineating one of the supports of angle brackets; Figure 8 is an elevation showing one of the standards, in part.

The device forming the subject matter of this application comprises a vehicle including a frame 1, including a rear bar 2, an intermediate bar 3 and a front bar 4. Crank axles 5 are provided, ground wheels 6 being journaled on the lower ends of the axles. The upper ends of the axles 5 are mounted to rotate, for adjustment, in bearings 7 on the sides of the frame 1. Levers 8 are secured to the upper ends of the crank axles 5 and are provided with latch mechanisms 9 adapted to cooperate with segments 10 on the frame 1.

Obviously, through the instrumentality of the levers 8, the crank axles 5 may be swung in vertical planes, thereby to effect a raising and lowering of the frame 1 with respect to the ground wheels 6, the latch mechanisms 9 on the levers 8 being engaged with the segments 10 to hold the parts in adjusted positions.

The numeral 11 marks a draft tongue, the rear end of which is pivotally mounted at 12 on the intermediate bar 3 of the frame 1. The tongue 11 is adapted to swing vertically, for adjustment, within a U-shaped guide 14 mounted, as indicated at 15 on the front bar 4 of the frame 1. The guide 14 is sustained by lateral braces 16 connected at 17 to the frame 1 and connected, as shown at 18 at their upper ends, to the side portions of the guide 14. The numeral 19 marks an angular lever fulcrumed at 20 on the upper end of the guide 14 and carrying a latch mechanism 21 adapted to cooperate with a segment 22 on the tongue 11, the lever being pivoted at 23 to the segment.

The lever 19 may be swung upwardly and downwardly, and the latch mechanism 21 may be engaged with the segment 22, to hold the tongue 11 at adjusted angles, in a vertical plane, with respect to the frame 1, thereby adjusting the draft properly with respect to the draft animals.

Supports 24, in the form of angle brackets are provided, each support comprising a horizontal flange 25 and a depending vertical flange 26, the flange 26 carrying a forwardly presented vertical web 27. The supports 24 are mounted on the forward edge of the rear bar 2 of the frame 1, the rear bar being received in the angles defined by the flanges 25 and 26. Tightening devices 28, such as bolts, pass through the depending vertical flanges 26 of the supports 24 and carry nuts 29. Rollers 30 are journaled on the rear ends of the bolts 28. The forward ends of the bolts 28 pass through hangers 31 which abut against the flanges 26 of the supports 24. Flexible elements, such as chains 32 are provided, the forward ends of the chains being secured to the upper ends of the hangers 31, the chains extending rearwardly across the upper surface of the rear bar 2 of the frame 1. Forwardly inclined downwardly converging braces 82 are provided, the same having outwardly extended feet 33 which fit against the lower surface of the rear bar 2 of the frame 1. Chains 34 are shown, the lower ends of the chains being connected to the braces 82, the chains passing upwardly over the rollers 30 and across the feet 33 of the braces 82, to hold the braces on the rear bar 2 of the frame 1, the chains extending upwardly across the rear edge of the frame 1, and being extended, thence, forwardly, the forward ends of the chains 32 being connected with the rear ends of the chain 32 through the instrumentality of releasable connecting devices 35.

The device comprises a curved standard 37 having a depending end 38, and comprises, also, a straight standard 36. The end 38 of the standard 37, and the intermediate portion of the straight standard 36 are located between the flanges 27 of the supports 24 and are held thereto by a securing element 39. The curved standard 37 extends rearwardly and downwardly behind the frame 1. Braces 40 are provided, the forward ends of the braces 40 being connected to the hangers 31. The hangers 31 may be considered as part of the braces 40. The numeral 41 marks a forward weed cutter including a lateral foot 42 having an upstanding arm 43 united by a pivot element 44 with the lower ends of the braces 82 and with the lower ends of the standard 36. The arm 43 of the weed cutter 41 is supplied with openings 45, located in the arc of a circle, the center of which is the pivot element 44. A securing member 46 is mounted in the lower end of the standard 36, in a slot 47 formed in the standard, and is adapted to be mounted in any one of a plurality of openings 45, formed in the arm 43 of the weed cutter 41, the openings 45 being disposed in a circle the center of which is the pivot element 44. The construction, obviously, is such that the foot 42 may be tilted at different angles with respect to the soil and be held at any angle to which it may have been adjusted.

A rear weed cutter 48 is provided, the same comprising a lateral foot 49 and an upstanding arm 50 the arm 50 being united by a pivot element 51 with the lower end of the standard 37. The arm 50 has openings 52 located in an arc, the center of which is the pivot element 51. A securing element 53 may be mounted in any of the openings 52 and in a slot 54 formed in the lower end of the standard 37, the construction being such that the foot 49 of the weed cutter 48 may be disposed at various angles with respect to the soil, as hereinbefore described in connection with the weed cutter 41.

By slacking away the connecting devices 35, the chains 32 and 34 may be separated, thereby permitting the device to be detached without difficulty from the frame 1, it being possible to use the weed cutting means in connection with a cultivator frame or with a frame of any other desired sort.

It may be desirable to mount the standard 60 yieldingly as indicated in Figure 4, the standard 60 corresponding to the standard 37. The numeral 55 marks any convenient bar of the frame and on the bar 55 brackets 56 are mounted, the brackets having upstanding flanges 57 provided with upwardly prolonged extensions 58 having openings on their inner surfaces, the openings defining a recess 59. The standard 60 projects between the flanges 57 and is connected thereto by a pivot element 61. The numeral 62 marks a plunger which is pivoted at its lower end, as indicated at 63 to the standard 60, the plunger passing through the recess 59 and being mounted slidably at its upper end in the parts 58 of the brackets 56. A compression spring 64 is located in the recess 59 and bears at its lower end on the standard 60, the spring being located in the recess 59, the upper end of the spring abutting against the extensions 58 at the upper end of the recess. Obviously, the spring 64 exerts a downward thrust on the standard 60, and holds the weed cutter (not shown) which is carried by the standard yieldably in the ground, it being possible for the standard to swing upwardly, to a slight extent, when an obstacle of any kind is encountered the spring 64 being compressed under such circumstances.

Passing to Figure 6, the numeral 65 marks a standard adapted to be assembled with the frame 1, the standard 65 being V-shaped in cross section. Soil-engaging elements 66 are shown, the same being provided at their inner ends with rearwardly extended flanges 67, the flange of one soil-engaging element being disposed opposite to the flange of the other soil engaging element. Between the soil-engaging elements 66 and between the flanges 67 of the respective soil engaging elements, shims or spacers 68 which preferably are V-shaped in cross section may be placed, the standard, the soil-engaging elements and the shims being united by one or more securing elements 69. The construction of the device is such owing to the presence of the shims or spacers 68 that the soil-engaging elements may be fitted together, on the standard 66, even though the soil-engaging elements may differ slightly in configuration or size.

What is claimed is:—

1. In a device of the class described, a support; a standard mounted on the support; a soil-engaging element carried by the standard; a brace for the standard; a hanger cooperating with the support; a flexible element connected at its ends with the hanger and with the intermediate portion of the brace, the flexible element engaging the upper end of the brace; tightening means mounted in the hanger and engaging the flexible element; and a releasable connection interposed in the flexible element.

2. In a device of the class described, a support; a standard mounted on the support; a soil-engaging element carried by the standard; a brace for the standard; the brace cooperating with the support; a tightening device; means for supporting the frame; a flexible element engaged at one end to the brace; means for anchoring the other end of the flexible element; and a releasable connection in the flexible element, the flexible element being trained across the tightening device.

3. In a device of the class described, a support; standards mounted on the support; soil-engaging elements on the standards; braces for the standards; a flexible element connected to the braces, the flexible element cooperating with the upper end of one brace; a tightening device engaging the flexible element; means for supporting the tightening device; a releasable connection constituting part of the flexible element.

In testimony that I claim the foregoing as my own, I have hereto affixed my signature in the presence of two witnesses.

SAMUEL JOHNSON.

Witnesses:
 IVOR AJAX,
 FRED BRYON.